UNITED STATES PATENT OFFICE 2,657,152

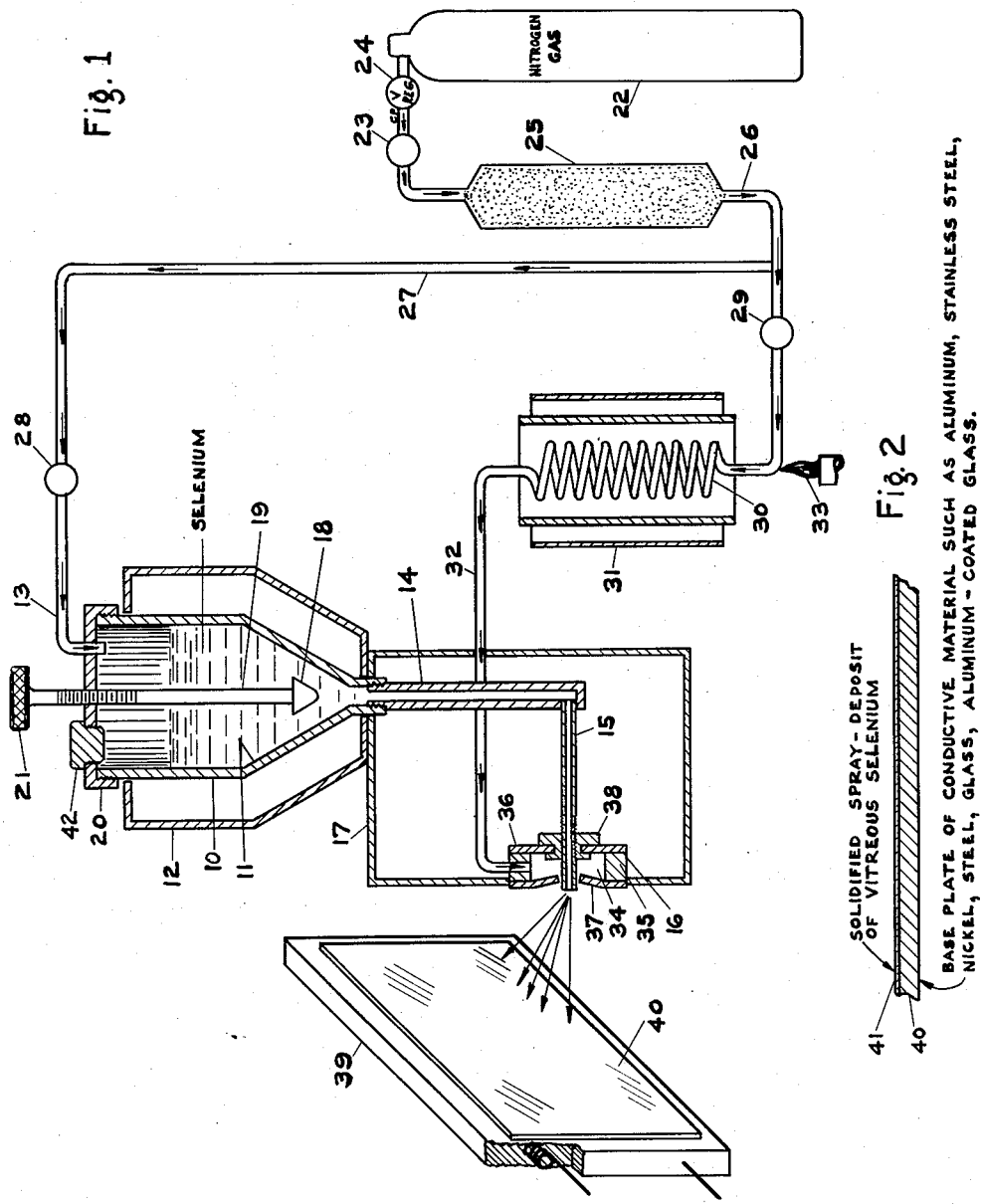
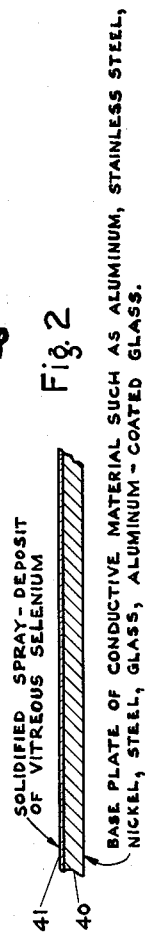

PROCESS OF PRODUCING AN ELECTROPHOTOGRAPHIC PLATE

Otavio J. Mengali and Arthur E. Middleton, Columbus, Ohio, assignors, by mesne assignments, to The Haloid Company, Rochester, N. Y., a corporation of New York Application March 31, 1950, Serial No. 153,052

5 Claims. (Cl. 117—53)

The present invention relates to a method or process of producing an electrophotographic plate containing an adherent layer of selenium. In particular, it relates to a method of coating a base plate with selenium so that when an electrostatic charge is placed on the selenium coating, the selenium coating will act as an electrical insulator to the charge in the dark and as an electrical conductor to the charge on exposure to light.

Selenium exists in several solid forms: metallic, crystalline and amorphous and/or vitreous. Neither the amorphous or vitreous forms show crystalline patterns on X-ray analysis. They are believed to differ mainly in that one comprises very finely divided particles while the other consists of super cooled liquid. A plate coated with selenium in the vitreous, amorphous, or even alpha monoclinic crystalline forms, or mixtures thereof, where it is believed that selenium rings or chain molecules exist with a minimum of metallic binding between the molecules, will hold an electric charge in the dark and dissipate it rapidly on exposure to light. Thus, in these forms, selenium is useful as an electrophotographic material. Some vitreous selenium coatings have been shown by X-ray analyses to contain a very small amount of hexagonal crystalline selenium, while still having excellent electrophotographic properties. However, if larger amounts of gray hexagonal selenium are present or if the coating is entirely gray hexagonal selenium, the coating is not capable of holding an electrostatic charge and is, therefore, unsuitable for a coating of an electrophotographic plate.

It is, therefore, an object of this invention to provide a method or process for producing an electrophotographic plate having an adherent coating of essentially amorphous, vitreous or alpha monoclinic selenium or mixtures thereof, where the coating acts as a good electrical insulator in the dark and exhibits electrical conductivity on exposure to light.

It has now been found that an electrophotographic plate can be produced having a photoconductive coating of essentially vitreous selenium which acts as an electrical insulator in the dark but has a substantial conductivity on exposure to light, by using a hot inert gas to spray or atomize molten selenium onto a plate having a temperature slightly less than that of the molten selenium particles so that the molten selenium on striking the plate rapidly forms a vitreous film just below the melting point of the selenium and before any hexagonal selenium crystals can begin to nucleate. The plate can be used directly in the electrophotographic process to produce excellent powder images or prints, and if any background appears due to ripples from spraying it can be readily removed by polishing. The coating produced by this process is hard, glossy and adherent to the base plate and evidences no tendency to crack, chip, or peel.

The invention comprises the method and product of manufacture, combination of elements and arrangement of apparatus referred to above or which will be brought out and exemplified in the disclosure hereinafter set forth including the illustrations in the drawing.

In the drawing:

Figure 1 is a diagram illustrating features of a spraying apparatus adapted to carry out certain steps of the present invention; and Figure 2 is a sectional view of an electrophotographic plate embodying features of the present invention.

Prior to use, the selenium can have any form, either crystalline or vitreous, since it will be in the molten state when sprayed. The selenium, however, should be free of such impurities as copper, iron, lead and bismuth which appear to adversely affect its ability to hold the relatively small electrostatic charges which are utilized in the electrophotographic process. It is preferred to use amorphous "A. R. Q.," a trade name for selenium in pellet form, $\frac{1}{16}''$ to $\frac{1}{8}''$ size, since this is a purified form of selenium containing less than about 20 parts per million of impurities. Other grades and types of selenium as furnished commercially, i. e. "D. D. Q." (double distilled in quartz) and "C. C. R." (commercially powdered grade), trade names for other forms of selenium as identified by the descriptions appearing in parentheses can be used if further purified. To obtain essentially pure selenium from the impure forms, it is the usual practice to first free it of copper, iron, lead or bismuth by distillation and to next melt down the required amount of selenium in a container by heating to a temperature of about 250° C. The molten selenium is then dropped through a shot tower, or in the laboratory by means of an eye dropper, into water. The resulting pellets of selenium are then treated with petroleum ether to remove water and allowed to air dry. The pure selenium can also be remelted and cast in porcelain boats to form sticks. If desired, the selenium in the form of sticks or pellets can be cut up, ground up, micropulverized, or worked in a mortar and pestle which reduces it to a very fine size, i. e., a particle size of about 1 to 50 microns, thus enabling the selenium to readily and quickly melt in a relatively short time in the spraying equipment.

Figure 1 illustrates schematically a spraying apparatus which has been used successfully in carrying out the coating method of the present invention. The selenium is melted in the material container or reservoir of a metal spray gun. The reservoir has an inert lining 11 of a material which does not affect the selenium or produce any deleterious by-products. A gas or electric heating jacket 12 surrounds the reservoir and is kept at a temperature sufficient to melt the selenium in the reservoir and heat it to a temperature of from about 240° C. to about 400° C. It was found that if the selenium is heated to less than 240° C., the sprayed selenium particles will have little heat content, and, thus, the selenium particles reaching the plate are not essentially molten and are in or tend to rapidly develop into the hexagonal form. A temperature above 400° C. is wasteful of selenium, for the selenium sublimes. A temperature of about 250 to about 375° C. for the molten selenium is to be preferred, for at this temperature the selenium is fluid and the selenium particles remain molten until they reach the plate. Moreover, due to their high initial temperature, they will have retained substantially all of their heat during the spraying process so that a layer of molten selenium is immediately formed on reaching the plate.

The bottom of reservoir 10 is conically tapered or funnel-shaped, the vertex communicating with a downwardly-directed feed pipe 14 the lower end of which is coupled to liquid jet tube 15 of atomizer nozzle 16. Feed pipe 14, tube 15 and the housing of nozzle 16 are surrounded by a box-type electric or gas heater 17 to maintain the parts at the preferred temperature for the molten selenium.

A conical valve or stopper member 18 attached to the lower end of a threaded rod 19 is suspended inside reservoir 10 to provide an adjustable closure for the outlet to feed pipe 14 and control the rate of flow of molten selenium to the atomizer during spraying. Rod 19 is threaded and is supported in a threaded central opening in cover 20 of reservoir 10 and provided with a knurled head 21 for manual turning.

Cover 20 is screwed onto the top of reservoir 10 with a tight fit or seal and a gas pressure supply tube 13 enters through an opening in the cover.

An inert, pressurized and heated gas is used to spray the molten selenium. The gas used to spray the molten selenium should not be air or other gaseous media containing appreciable amounts of oxygen or water vapor. Oxygen or water vapor in the spray gas apparently causes the formation of hexagonal selenium and other compounds which reduce the efficiency of the electrophotographic plate. It is preferred to use nitrogen, argon, helium, neon and similar gases which, for the purpose of this invention, are considered inert. The commercially available grades can be used which contain only very minor amounts of impurities.

In the apparatus illustrated the gas is supplied from cylinder 22 of compressed gas. The gas is fed from the cylinder through pressure regulator 23, shut-off valve 24 and drying tower 25 to gas feed line 26. Branch gas line 27, fed by line 26, supplies gas pressure to tube 13 through control valve 28. Gas feed line 26 supplies gas through quick-acting control valve 29 to coil 30 which passes through a heater 31 to atomizer gas supply tube 32 leading to atomizer nozzle 16.

Nozzle 16 comprises an annular orifice chamber 34 surrounding the end of jet tube 15. The chamber 34 is supplied with gas through tube 32 which enters the chamber through annular wall 35 of the chamber. The back of the chamber is closed by annular disk 36 closely fitting onto jet tube 15 and the front by annular orifice disk 37 which has a central aperture surrounding and spaced from jet tube 15 to provide an atomizing gas stream around the end of the jet tube. A knurled head 38 is threaded onto tube 15 behind nozzle 16 to enable the nozzle to be adjusted lengthwise of the jet tube to vary the rate of flow of molten selenium to the spray.

Gas drying tower 25 may be a refrigeration-type drier, or a desiccator tube of calcium chloride or other moisture absorbing material.

Heating of the gas is accomplished by any convenient means although it is preferred to pass the gas through coils 30 heated by a gas flame 33, as shown, or electrical resistance wire, or the like. The gas is preferably heated to a temperature of about 225° C. to 350° C. so that on contacting the selenium the gas has a temperature equal to or above the melting point of the selenium particles and helps to prevent the selenium particles from losing heat when sprayed, thereby maintaining them in the molten state. Preferably, the gas is heated to a temperature of about 260° C. Pressure regulator 23 is adjusted so that the gas is passed through the system at a pressure of from 50 to 70 lbs./sq. in., and it is very desirable that the pressure be from about 60 to about 70 lbs./sq. in. Pressures less than 50 lbs./sq. in. cause sputtering and it is difficult to control the spray. Above 80 lbs./sq. in. the sprayed selenium particles tend to cool too rapidly due to the rapid expansion of the gaseous mixture leaving the Venturi nozzle, resulting in the formation of gray hexagonal selenium on the base plate. Furthermore, high pressures form ripples or cause mottling of the coating which requires extensive grinding and finishing to effect removal thereof.

A heater 39 supporting a plate 40 to be sprayed is positioned in front of nozzle 16 so that the plate can receive a spray-deposit of selenium. Heater 39 may be a hotplate, as shown, although other heating means, such as a gas flame, electric coil or infrared lamp may be used.

The base material or plate used in this process should have an electrical resistance less than the vitreous selenium coating so that it will act as a conductive backing to conduct away electric charges when the electrically charged selenium coating is exposed to light. Materials having electrical resistivities up to $10^{10}$ ohms-cm. are generally satisfactory for the base plate, although it has been found best to use materials having an electrical resistivity of less than about $10^5$ ohms-cm. The base plate should also be able to withstand temperatures of up to about 220° C. without cracking, distortion or deterioration. As long as the plate is relatively thin so as to dissipate the head rapidly, the thickness of the base plate does not appear to make any appreciable difference. The results obtained with aluminum of from $\frac{1}{16}''$ to 0.005'' were essentially the same. The base plate is generally a square or rectangular flat sheet but it can have any other desired shape and surface contour. The surface of the plate should be cleaned before coating with the selenium in order to remove grease and other dirt which might prevent firm adherence of the coating to the base plate. This is readily accomplished by washing the plate with any suitable alkali cleaner, or with a hydrocarbon solvent, like benzene, followed by rinsing. Finally, any gross surface irregularities, i. e., burrs, tool marks, etc., are removed by grinding or polishing, although it it not necessary to polish the plate until it has mirror-like reflectivity. Acceptable materials for the base plate have been found to be aluminum, glass, aluminum-coated glass, stainless steel, nickel, and steel, which on heating do not react with the molten selenium particles to produce undesirable compounds like selenium oxides or metallic selenium compounds, etc., which would adversely affect the electrophotographic properties of the slate. It is obvious to those skilled in the art that other materials having electrical resistances similar to the aforementioned and capable of withstanding the conditions imposed during the selenium film formation can also be used as base plates for the selenium coating.

In operation, to produce an electrophotographic plate the base plate 40 is heated to a temperature of from about 180° C. to about 220° C. while the molten selenium is sprayed onto the plate to form a coating 41 (Figure 2).

The metallizing spray gun and its associated apparatus is cleaned prior to use to prevent the introduction of impurities into the selenium which might adversely affect the electrophotographic properties of the selenium coating. The equipment is kept substantially airtight to eliminate air, water vapor or oxygen which might react with the molten selenium to produce selenium oxides or other materials which reduce the electrophotographic properties of or cause the formation of hexagonal selenium in the resulting coating.

After cleaning the apparatus, the granular or powdered selenium is placed in reservoir 10 by removing screw-plug 42, while stopper 18 is screwed down against the tapered bottom of the reservoir to seal the outlet. The plug is reinserted to seal the reservoir and the selenium is fused and heated to a temperature of about 250° C.

Regulating valve 23 is set to supply a pressure of about 80 p. s. i. and shutoff valve 24 is opened to supply gas pressure to lines 26 and 27 through the drying tower 25. Control valve 28 in line 27 is opened to supply a positive gas pressure through tube 13 to the top of reservoir 10.

A cleaned flat aluminum plate to be sprayed is placed on heater 39 and heated to about 190° C. The plate is spaced about 12 inches from nozzle 16.

Coil 30 is heated to about 250° C. by gas burner 33, and valve 29 is opened to supply the atomizer nozzle with a stream of heated nitrogen gas. Stopper 18 is then raised by turning head 21 until a controlled flow of molten selenium is driven through feed pipe 14 and jet tube 15. A spray of molten selenium is thereby emitted from the nozzle and is projected onto plate 40. By regulating the nozzle setting with head 38 the spray can be emitted as a dense fog of molten selenium particles. Spraying is performed under a hood or a mask is worn to prevent inhalation of selenium.

Plate 40 is passed back and forth in front of the spray nozzle until it is completely and homogeneously covered with a spray-deposit 41 of molten selenium. The distance of the plate from the gun nozzle is kept relatively small to prevent loss of specific heat by the molten selenium particles before reaching the plate and to prevent too long contact with atmospheric gases, i. e., oxygen and water vapor. Where the jet orifice or nozzle of the gun has an opening of from 1/32 to 1/4 of an inch with gas pressures of 50 to 80 p. s. i., the plate is from 3/4 to 1 1/2 feet from the nozzle. It is preferred to use a distance of about 1 foot with 60 to 70 p. s. i. gas pressure and a nozzle opening of 1/16 of an inch. It is, of course, apparent that the nozzle opening, gas pressure and distance can be varied over a wide range to produce acceptable coatings on plates. It is also contemplated that the spraying can be performed in an inert atmosphere which may be heated to prevent a great loss of heat by the selenium particles. For practical purposes it is usually preferred to spray through air at room temperature.

The selenium particles striking the plate have a temperature of from about 240° C. to about 375° C. In this manner the selenium particles on touching the plate will form a film thereon before solidifying in the vitreous state. If the temperature of the plate is below about 180° C., the plate is so cold, relatively speaking, that crystalline hexagonal selenium quickly forms. On the other hand, if the plate is heated much above about 220° C., the selenium particles striking the plate are likely to sublime or vaporize rather than form a film, or both the plate and selenium coating will contain so much heat that the rate of cooling of the selenium is considerably retarded resulting in the formation of hexagonal selenium. It is preferred to heat the plate to a temperature of about 200° C.

The atomizer setting and spraying time are adjusted to give the desired thickness of coating. This can readily be determined by a few trial sprayings. Coatings of a thickness between 0.0001 and 0.01 of an inch are useful. A coating having a thickness of 0.0001 inch is about the lowest practical limit with present day spraying equipment, for if the coating is too thin, pinholes are apt to occur so that a continuous film is not produced and the layer is too thin to hold a measurable electric charge or a charge requisite for practicing electrophotography. Thicknesses above 0.01 inch do not apparently increase the speed of the plate nor materially enhance its electrophotographic properties, and, thus, thicknesses greater than 0.01 inch are wasteful of selenium. For reasons of economy it is preferred to obtain coatings ranging in thickness from 0.0005 to 0.002 inch which provide excellent electrophotographic plates. It is also desirable that the selenium layer on the plate be substantially smooth and flat in order to make good powder images in the electrophotography process.

After spraying, the plate is allowed to cool in air at room temperature. If the sprayed selenium film becomes somewhat wavy or mottled due to the pressurized gases used, or due to surface irregularities from the underlying base plate, it can be rendered substantially flat and smooth by polishing. Metallographic polishing methods have been found best as they are less wasteful of selenium and produce finer finishes. Certain precautions, however, should be observed. First, the selenium coating should not be finally polished with a material which will leave a deposit to discharge the plate or adversely affect its electrophotographic properties. Suitable inert polishing compounds of this type are liquids containing fine suspensions of chromium oxide. An excellent polishing compound of this type is "C. R. O.," a trade name for a commercial brand of metallographic polish. Secondly, during polishing, the temperature of the film should not be allowed to exceed 50° C. in order to prevent the formation of hexagonal selenium from the vitreous material. As an example, the film is first polished under cool water with fine-size grit in one direction, next polished under water in a direction perpendicular to the first with a finer size grit, and finally polished with "C. R. O." metallographic polish which removes any remaining grit particles and finishes the surface. The resulting film or coat 41 is then smooth, black and glossy and has a flat surface, and when used in the electrophotographic process, no spots or background appear on the resulting prints.

Figure 2 is a cross section of a portion of a completed electrophotographic plate comprising a base plate 40 and a solidified spray-deposit of vitreous selenium.

In most cases it is desired to use pure refined selenium as the coating material in order to achieve the highest photoconductivity, but it has been found that additions of sulfur in the range of 0.1 to 3 per cent by weight do not materially decrease the photoconductivity and that such additions facilitate spraying in the lower portion of the spraying temperature range by reducing the viscosity of the selenium.

While it is not precisely understood why vitreous selenium films can be produced as disclosed herein, it is believed that on cooling the hot selenium particles of the film coating the plate pass through their crystalline point so rapidly that only submicroscopic seed crystals (insulated from one another by molecular selenium) of the metallic or hexagonal form of selenium are formed. The heat capacity of the molten selenium particles is small where the spray is in the form of a dense fog or smoke. The particles also have a temperature above the melting point of selenium, and when they strike the plate which is below their melting point temperature but above the nucleation temperature of crystalline hexagonal selenium, a very rapid cooling occurs converting the molten selenium to the essentially vitreous state, although possibly some amorphous and/or alpha monoclinic selenium are also present. Moreover, allowing the coated plate to cool in air at room temperature allows even shrinkage and balancing of stresses in the plate and film, thus preventing uneven contraction between the base plate and the vitreous selenium film which might reduce the adherence of the selenium and produce cracks and peeling.

X-ray and other studies were made of electrophotographic plates containing coatings produced by the methods described herein. They revealed that the coatings contained essentially only vitreous selenium. It is possible that amorphous and alpha monoclinic selenium are present, although their presence is not precisely known and would not detrimentally affect the plates since they are also electrophotographic materials. All of the plates exhibited very low dark decay and produced excellent powder images when used in the electrophotographic process. The excellent results obtained with plates coated by the process disclosed herein indicated that no hexagonal selenium was present, or, if present, the quantity was so small that its effect was negligible or nonexistent.

It is evident from the foregoing that it has been found that a base plate having an electrophotographic coating of essentially vitreous selenium with possibly minor inclusions of amorphous or monoclinic selenium is obtained by spraying molten selenium with hot inert gas under perssure onto a hot base plate having an electrical resistance less than the selenium and having a temperature less than the molten selenium. In this way, a vitreous film forms and solidifies before any hexagonal crystalline selenium develops. Thus, there is produced a base plate having an adherent vitreous coating of selenium which will receive and hold an electrostatic charge in the dark and dissipate it rapidly on exposure to light. This process also lends itself very readily to the continuous production of selenium plates. For example, a continuous line of base plates can be successively passed in front of the spray equipment and sprayed with molten selenium. If required, a conveyor and pipe line can be provided to continuously supply selenium and inert gas to the metallizing gun to maintain an ample supply of these materials. Thus, it is possible by this process to provide in volume and in a very short time vitreous selenium-coated electrophotographic plates having excellent characteristics.

While the present invention, as to its objects and advantages, has been described herein as carried out in specific embodiments thereof, it is not desired to be limited thereby, but it is intended to cover the invention as broadly as the art will permit, within the spirit and scope of the appended claims.

What is claimed is:

1. In the method of producing an electrophotographic plate, the steps consisting of fusing substantially pure selenium and heating said selenium to a temperature in the range between 240 to 400° C., heating an inert gas to a temperature in the range between 225 to 350° C., and atomizing said selenium by a stream of said gas under pressure of 50 to 80# per square inch to spray said selenium in fine molten particles onto a base having a temperature of from 180 to 220° C. and an electrical resistivity of less than $10^{10}$ ohms-cm.

2. In the method of producing an electrophotographic plate, the steps consisting of heating substantially pure selenium in the absence of air to a temperature of from 250 to 375° C., causing an inert gas at a temperature of about 260° C. and a pressure of from 60 to 70 p. s. i. to atomize and spray said molten selenium as a fog a distance of from ¾ to 1½ feet onto a base plate having an electrical resistivity of less than $10^5$ ohm-cm. and having a temperature of about 200° C., and then allowing the resulting coated plate to air cool.

3. In the method of producing an electrophotographic plate comprising a base plate having an adherent coating of vitreous selenium, the steps consisting of heating substantially pure selenium to a temperature in the range between 240° to 400° C., heating an inert gas to a temperature between 225° to 350° C., causing said gas a pressure of from 50 to 80 p. si i. to atomize and spray said selenium in fine molten particles a relatively short distance onto a base layer having a temperature of from 180° to 220° C. and an electrical resistivity of less than about $10^5$ ohms-cm., allowing the resulting composite article to cool in air at room temperature, and finally metallographically polishing the cooled plate under water.

4. The method as claimed in claim 1, in which said coating, after cooling, is polished smooth at a temperature below 50° C.

5. The method as claimed in claim 1, in which said coating, after cooling, is polished smooth under water at a temperature below 50° C.

OTAVIO J. MENGALI.
ARTHUR E. MIDDLETON.

References Cited in the file of this patent

UNITED STATES PATENTS

| Number | Name | Date |
|---|---|---|
| 2,168,462 | Williams et al. | Aug. 8, 1939 |
| 2,197,274 | Menke | Apr. 16, 1940 |
| 2,199,104 | Johnson et al. | Apr. 30, 1940 |
| 2,254,429 | Kreutzer | Sept. 2, 1941 |
| 2,354,109 | Flood | July 18, 1944 |